(12) United States Patent
Bildner et al.

(10) Patent No.: US 11,783,572 B2
(45) Date of Patent: Oct. 10, 2023

(54) METHOD OF AUTOMATICALLY EXTRACTING INFORMATION OF A PREDEFINED TYPE FROM A DOCUMENT

(71) Applicant: Amadeus S.A.S., Biot (FR)

(72) Inventors: Sebastian Andreas Bildner, Munich (DE); Paul Krion, Munich (DE); Thomas Stark, Munich (DE); Martin Christopher Stämmler, Munich (DE); Martin Von Schledorn, Munich (DE); Jürgen Oesterle, Munich (DE); Renjith Karimattathil Sasidharan, Bangalore (IN)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 17/828,303

(22) Filed: May 31, 2022

(65) Prior Publication Data

US 2022/0292863 A1 Sep. 15, 2022

Related U.S. Application Data

(63) Continuation of application No. 16/907,935, filed on Jun. 22, 2020, now Pat. No. 11,367,297.

(30) Foreign Application Priority Data

Jul. 1, 2019 (FR) ...................................... 1907252

(51) Int. Cl.
*G06V 10/82* (2022.01)
*G06V 30/414* (2022.01)
(Continued)

(52) U.S. Cl.
CPC ............ *G06V 10/82* (2022.01); *G06F 18/214* (2023.01); *G06N 3/08* (2013.01); *G06V 30/1444* (2022.01);
(Continued)

(58) Field of Classification Search
CPC .......... G06N 3/08; G06V 10/82; G06V 30/10; G06V 30/412; G06V 30/414; G06V 30/19173; G06F 18/214
See application file for complete search history.

(56) References Cited

U.S. PATENT DOCUMENTS

2008/0285792 A1 11/2008 Comay
2018/0189604 A1 7/2018 Zhang et al.
(Continued)

OTHER PUBLICATIONS

Karan Purohit I Saarthi.ai: "Tutorial : Building a custom OCR using YOLO and Tesseract." May 9, 2019 (May 9, 2019), pp. 1-11, XP055917219, Retrieved from the Internet: URL:https://medium.com/saarthi-ai/how-to-build-your-own-ocr-a5bb91b622ba.
(Continued)

*Primary Examiner* — Daniel G Mariam
(74) *Attorney, Agent, or Firm* — Thompson Hine LLP (57) ABSTRACT

Method and system of automatically extracting information of a predefined type from a document is provided. The method includes identifying a location and classification of a segment of interest of a document that includes information associated with a predefined type. The method further includes identifying a location and classification of characters from the segment of interest based on characteristics associated with the predefined type. The method further includes extracting the identified characters from the segment of interested associated with the predefined type.

20 Claims, 7 Drawing Sheets

(51) Int. Cl.
  *G06F 18/214* (2023.01)
  *G06N 3/08* (2023.01)
  *G06V 30/14* (2022.01)
  *G06V 30/19* (2022.01)
  *G06V 30/412* (2022.01)
  *G06V 30/10* (2022.01)
(52) U.S. Cl.
  CPC ...... *G06V 30/19173* (2022.01); *G06V 30/412* (2022.01); *G06V 30/414* (2022.01); *G06V 30/10* (2022.01)

(56) References Cited

U.S. PATENT DOCUMENTS

2019/0019020 A1   1/2019   Flament et al.
2020/0342221 A1   10/2020  Sampath et al.

OTHER PUBLICATIONS

European Patent Office, Office Action issued in European Patent Application No. 20178232.3 dated Oct. 19, 2022, pages.
Redmon, et al. "YOLO9000: Better, Faster, Stronger", The IEEE Conference on Computer Vision and Pattern Recognition (CVPR), 2017, pp. 7263-7271.
National Institute of Industrial Property, Preliminary Search Report issued in French Patent Application No. 1907252 dated Mar. 30, 2020 and English translation thereof, 16 pages.
European Patent Office, Extended European Search Report issued in European Patent Application No. 20178232.3 dated Nov. 25, 2020, 6 pages.

METHOD OF AUTOMATICALLY EXTRACTING INFORMATION OF A PREDEFINED TYPE FROM A DOCUMENT

CROSS-REFERENCE TO RELATED APPLICATIONS

This application is a continuation of U.S. patent application Ser. No. 16/907,935, filed Jun. 22, 2020, which is hereby incorporated by reference herein in its entirety.

BACKGROUND

The present invention generally relates to information extraction, in particular to extraction of information of a predefined type from documents. The extracted information of a predefined type is, for example, information from a datasheet pertaining to technical elements (semiconductors etc.), information from receipts (total amount etc.) and the like.

YOLO9000: Better, Faster, Stronger by Joseph Redmon, Ali Farhadi, University of Washington, Allen Institute for AI (arXiv: 1612.08242v1 [cs.CV] 25 Dec. 2016), relates to real time object-detection, capable of detecting various object categories and applied to pictures.

Entering data corresponding to information of a predefined type is often performed manually and is currently assisted by conventional optical character recognition (OCR).

SUMMARY

According to first aspect, a method of automatically extracting information of a predefined type from a document is provided. The method comprises using an object detection algorithm to identify at least one segment of the document that is likely to comprise the information of the predefined type, hereinafter referred to as "segment of interest". The method further comprises building at least one bounding box corresponding to the at least one segment, and in response to identifying that a bounding box likely comprises the information of the predefined type, extracting the information comprised by the bounding box from the at least one bounding box.

According to a second aspect, a computer system comprising at least one computer being arranged to execute the method according to the first aspect is provided.

According to a third aspect, a computer program product comprising program code instructions stored on a computer readable medium to execute the method steps according to the first aspect, when the program is executed on a computer, is provided.

A method of automatically extracting information of a predefined type from a document is provided. As mentioned above, the information of a predefined type is, for example, an information to be retrieved from a material or premanufactured part data sheet, a receipt or the like. Such information could be a radius of a wheel, a short-circuit current, when information is to be extracted from a material or premanufactured part data sheet. The information could be numbers like a receipt number, VAT-ID or a total amount of a receipt, when information is to be extracted from a receipt or the like.

The method comprises using an object detection algorithm to identify at least one segment of interest. As such, for example, a specialized OCR solution is applied to focus to meaningful areas on the document. Identification and extraction of important objects on receipts, like total amounts and creation dates can be achieved in a mostly language-independent way, for example, by exploiting visual document structure in this way. As the visual structure of the document is exploited, the method could, for example, also be used for spare and incomplete text fragments and low-resolution images, as only the information of a predefined type is targeted and character recognition for the rest of the document can be dispensed with. The recognition happens, for example, on low-resolution images, reducing processing time and memory requirements and the method is potentially applicable on mobile devices.

The method of automatically extracting information involves building at least one bounding box corresponding to the at least one segment and in response to identifying that a bounding box likely comprises the information of the predefined type, extracting the information comprised by the bounding box from the at least one bounding box.

To provide an example, an object detection algorithm based on convolutional neural networks is used for detecting the information of a predefined type on an image, for example, scanned from the document. This provides bounding boxes around candidates for the location of the information of the predefined type on the document. This may also provide each candidate with a probability of corresponding to the information of the predefined type to be extracted. As such, in some examples, a probability value is assigned to a bounding box, the probability value being indicative of the probability that a certain bounding box contains the information of the predefined type.

Furthermore, an object detection algorithm based on convolutional neural networks is, for example, used for optical character recognition. The result of this processing step comprises a bounding box for every detected character and probabilities for the character classification. The first and the second object detection algorithm is, for example, used to extract values of detected objects, together with confidence values.

In some examples, a character identification algorithm is used for extracting the information of the predefined type from the at least one bounding box. In some examples, the character identification algorithm used for extracting the information of the predefined type is configured to utilize characteristics of the information of the predefined type in order to recognize the information of the predefined type.

Higher character recognition accuracy can be reached by employing a custom, specialized OCR solution. As such, the OCR solution could be configured to be applied to single page documents, many numbers on a single page, little continuous text, low image quality and on limited character set. To provide an example, fully-convolutional networks intended for object detection are used for OCR. Object detection algorithms based on convolutional networks can deal better with certain degradations of the document image (reduced contrast, low resolution, etc.) than traditional OCR solutions by getting rid of binarization and character-segmentation steps. They are also faster, since they combine character localization and classification steps into one evaluation running on GPU.

In some examples, the utilized characteristics of the information of a predefined type comprise at least one of a comma or decimal point position and a number format.

In some examples, the neural network is a multilayer neural network, whereby each different layer is to identify different characteristics of the document.

In some examples, the method comprises a training activity for training the neural network with a plurality of documents to correctly extract the information of the predefined type.

The desired information of a predefined type used for the training is, for example, a total amount on a receipt. However, for example, any other data, such as numbers of a specific format on a technical data sheet may be used. In order to train the network for recognizing this desired information, a training set is generated by applying an OCR to document images in order to recognize the text on these images, along with bounding boxes for every character.

To produce ground truth data, for example, regular expressions and other grammars and rule-based approaches for finding occurrences within the OCR text are used. This is, for example, used for amounts, VAT-IDs or other data items with a very strict and characteristic syntax.

Depending on the data type to be recognized, feedback data containing the information of a predefined type can be used. This feedback data can be obtained from users that use the method and compare the extracted information of the predefined type with the information of the predefined type actually present. This feedback data is reliable, since the user has to confirm the correctness of the submitted data.

To provide an example, the user provides an arrival date for a hotel invoice. This value is normalized, so various different type-dependent notations for this value ("2019-01-18", "18. Jan 2019", etc.) can be generated, which the method then tries to identify in the OCR text.

From matches found, for example, per-character bounding boxes are extracted which are used as ground truth for the training of both object detection stages (the location stage of for the bounding box and the character detection stage). If no occurrence of a date of a particular type can be found in the OCR text, the document is not considered for training pertaining to that data type.

Stage of Detecting the Location of the Information of the Predefined Type:

An object detection network trained for detecting the location of the desired items on the document's image is applied. The result is a set of bounding boxes describing interesting locations on the document, in some examples, together with a type of the detected information (e.g., amount, date etc.).

The bounding box describes the location and the size of the information. It is used to crop the image to the dimensions of the bounding box, resulting in a fairly small picture likely containing only the image of the information of the predefined type to be extracted. Then, another convolutional network trained for character recognition is applied (see below).

Stage of Character Detection:

This exemplary approach provides the effect that the OCR can be custom-tailored for specific use cases, since the expected character set/word corresponding to the information of the predefined type is known. It is also faster than applying the custom OCR to the entire document, especially on mobile devices with limited computational capacity and available memory, in examples in which the method is performed on mobile devices.

For the character identification activity, for example, a different object detection algorithm is used than for identifying the segment of interest(s).

In some examples, a convolutional neural network, in particular a fully-convolutional neural network, is used by the object detection algorithm and/or the character identification algorithm.

In an example, a first customized convolutional neural network, intended to identify segment(s) of interest is applied and a second customized convolutional neural network, intended for character identification within the segments previously identified is used in order to extract the information.

As such, the character identification is, for example, based on a fully convolutional network. The output, again, for example, comprises bounding boxes together with classifications and probabilities, the same as in the localization step described above. Every bounding box may describe the location of a character. The classification may tell, which character is present in the bounding box.

In the next activity, for example, all bounding boxes from the result are collected. If two boxes intersect too much, only the one with the higher probability may be selected. The bounding boxes are, for example, sorted according to their horizontal position on the cropped image, corresponding to the segment of the document that is likely to contain the information of the predefined type which is comprised by the bounding box currently looked at. It is, for example, assumed that all characters are located in the same text line. For every bounding box B, a subset of the character set may be determined, consisting of all characters that are allowed to occur in this position. The subset is determined, for example, by syntax constraints and further constraints, such as a constraint related to the format and/or formation of characters (valid calendar date etc.).

In some examples, a probability value is assigned to a character identified by a character identification algorithm, the probability value being indicative of the probability that the identified character is identical with a character actually comprised by the information of the predefined type. From the above-mentioned subset of character determined, the character with the highest probability, as determined by the object detection algorithm, may be chosen.

In some examples, a probability value assigned to a bounding box and probability values assigned to characters within that bounding box are used to provide a combined confidence score. For example, if the product of the probabilities of all detected characters in a bounding box B in a token are above a threshold, this sequence of characters is accepted as a match. This has the consequence that longer matches may have a lower probability, which suits some applications, because longer matches have a higher risk of containing a mis-match and even just one mis-matched character renders the whole match useless. This is, for example, the case for application fields like datasheet number extractions and total amount extraction from receipts.

Returning of the Results to the User:

The such extracted value is then, for example, presented to the user for confirmation that the extracted value corresponds to the information of a predefined type actually present on the document. The extracted values are, for example, presented to the user on the screen of a mobile device, tablet or the like. The extracted value is, for example, used to pre-populate a form, in which the user has to input the extracted value among other data, the whole form—along with the filled in extracted information—might be stored on the mobile device for further evaluation of the data. To provide a use-case example, the automatic form may encompass manually configured values and the extracted value read from a datasheet. In another use-case example, the extracted value may be a total amount of a receipt and the user may enter all other relevant expense data into the form. If the user determined the recognized value to be wrong, he might change it according to his or her discretion. Finally, the user may have to confirm that all values in the form are correct.

The data gathered in the form is then, for example, uploaded to the backend system. Later, an auditor might check the uploaded data and compare it to the document from which the information of the predefined type was extracted. This manually validated data can serve as a sort of "feedback" data used to continuously train the neural network involved in the object and character detection.

The actual recognition step of the method might happen in the backend or in the document scanning device itself, e.g., a mobile phone with a camera or the like. In the case that the recognition is performed in the backend, the document photo is uploaded for recognition directly after taking the picture. In the case that the recognition is performed in the document scanning device itself, the extracted information may be permanently stored on the document scanning device for further evaluation of the extracted data. Also other use-cases may be employed, such as a use case in which the user uploads the document to the system via a website. The same workflow may be used here: The form fields, which the user must fill in, are, for example, pre-populated with the one or more extractions.

Structure and Function of the Neuronal Network Involved:

In some examples, a first layer of the neural network is directed to differentiate between empty and non-empty regions of a document and is further used to identify basic patterns present on the document and a second layer of the neural network is to identify shapes that are more complex compared to the basic patterns present on the document.

The exact architecture of the network is not of predominant importance, as it could be replaced with different architectures, as long as the definition of the final "decision layer" (see description below) remains the same.

Therefore, in some examples, the neural network is a neural network that is compatible with a decision layer, the decision layer being a neural network layer serving to detect at least one of (i) a location of the bounding box, (ii) height and width of a bounding box, and (iii) a classification score indicating a classification of a detected character. As an example, a YOLOv2 model, trained from scratch may be used.

The final decision layer of the network is, for example, a convolutional layer. This layer may consist of filters with width=1 and height=1. Nonetheless, the convolutional layer might effectively function as a regression layer. These kernels are, for example, arranged in a grid of a certain size (for fully convolutional networks, this size depends on the dimensions of the input image), effectively dividing the image along this grid. The 1×1 kernel in every such grid cell may contain a detection for each anchor box. Every detection, for example, contains the following information:

a. the exact location of the center of the bounding box
b. height and width of the bounding box
c. a so called "object-presence score" (which is a score that determines whether a bounding box contains an object at all)
d. classification scores The depth of every 1×1 kernel is, for example, B*(5+C), where B is the number of candidates the model predicts for every cell (which can be freely chosen; the default is 5).

The predicted values for every candidate are, for example, the above-mentioned "object-presence score", which corresponds, for example, to an the intersection over union of the ground truth and the candidate's predicted bounding box (intersection of over union is an evaluation metric for evaluating bounding box, the ground truth corresponds to the actual bounding boxes to be detected), four values (tx, ty, tw, th) indicating location and shape of the candidate's bounding box. The number of predicted values for every candidate is, for example, five. C values are reserved for the conditional probabilities of the object classification (corresponding to classification scores), given that there is an object. In this example, C is the number of classes the model is able to differentiate between. Those classes might correspond to alphanumeric, Arabic, Chinese or Japanese characters between which the model is to differentiate. There is, for example, a probability of 90% that the value to be extracted corresponds to the character "B" and a probability of 10% that the value to be extracted corresponds to the character "8".

The horizontal location of the predicted bounding box is, for example, calculated as bx=σ(tx)+cx, where tx is the predicted value and cx is the horizontal offset of the cell (kernel) in the two-dimensional grid. The vertical position by is, for example, defined in the same way. In this example, if the predicted values tx and ty are 0, the center of the predicted bounding box is located exactly in the center of the grid. In this example, the cell containing the center point of the bounding box is therefore responsible for detecting the object.

The width bw and bh height of the predicted bounding box are, for example, defined as $$b_w = p_w e^{t_w}$$

and $$b_h = p_h e^{t_h},$$

where pw and ph are the prior's bounding box width and height, respectively, while tw and th are the predicted values. In this example, if the predicted values tw and th are 0, the predicted bounding box is exactly equal to the prior.

This exemplary definition implies that in this example B priors/anchor boxes are defined, one for each prediction per cell. In order to choose these priors, for example, ground truth bounding boxes are clustered into B clusters according to their width and height. For each of these clusters, for example, one pair of ph and pw is chosen, such that the mean values tw and th for generating the ground truth boxes in the cluster are minimized.

Convolutional Neural Network Layers (CNN) Layers:

A layer in a two-dimensional convolutional network comprises, for example, multiple kernels. When applying the kernel to an image, the kernel, for example, moves across the image, which is, for example, also represented as a two-dimensional matrix of much bigger size. The kernel is, for example, subsequently applied to each patch until the whole image is covered. The image may correspond to a photo or scan of a document of which the information of the predefined type is to be extracted.

The application consists of multiplying every value in the kernel with the corresponding kernel in the image and then summing up all results. Example:

$$F = \begin{bmatrix} -1 & 1 & 0 \\ -1 & 1 & 0 \\ -1 & 1 & 0 \end{bmatrix}$$

$$I = \begin{bmatrix} 0.3 & 0.8 & 0.1 \\ 0.1 & 0.9 & 0.2 \\ 0.2 & 0.8 & 0.1 \end{bmatrix}$$

In the example above, the kernel is F and the image patch is I. In the middle of the image patch, there is a vertical line, indicated by the higher values (assuming that higher values mean darker colors). The kernel is defined in such a way that it detects left borders. Applying the kernel yields (−1*0.3)+ (−1*0.1)+(−1*0.2)+(1*0.8)+(1*0.9)+(1*0.8)=1.9. If the filter is moved one position to the right, the result is (−1*0.8)+ (−1*0.9)+(−1*0.8)+(1*0.1)+(1*0.2)+(1*0.1)=−2.1, which is much lower. Once the kernel has been applied to the whole image, the produced values build up an intensity map highlighting locations with vertical lines. This output of the convolution is then passed through an activation function. Since a layer consists of multiple kernels, instead of one, the result of every layer is a stack of such activation maps. If the following layer is another convolutional layer, it is applied to this activation map as before, but the kernels have a depth that is equal to the stack size of their input.

Max-Pooling Layers:

Some convolutional neural networks which may be used in the method, like YOLOv2, for example, employ a technique called max-pooling, in order to reduce the dimensions of an activation map. When applying max-pooling, a kernel of pre-defined size moves across the output image, passing through the highest values and discarding the rest. Another method to reduce the dimensions of such an intensity map is, for example, to increase the step size of the convolutional neural network's kernel applications.

In the following example, I is the activation map of a preceding convolutional layer. We apply a max-pooling layer of size 2×2 and stride size of two. The different fonts (underlined, italic, bold and standard) indicate the section of matrix I affected by the max pooling layer and the max pooling result is indicated in the matrix M.

$$I = \begin{bmatrix} 0 & 2 & 2 & 1 \\ 2 & 4 & 3 & 1 \\ 6 & 3 & 2 & 4 \\ 2 & 4 & 6 & 4 \end{bmatrix}$$

From each of the four submatrices (indicated by the dashed lines encircling them above), the element with the highest value is selected. The output layer M of the max-pooling layer then looks like this:

$$M = \begin{bmatrix} 4 & 3 \\ 6 & 6 \end{bmatrix}$$

After the max pooling layer has reduced the data to be processed, another kernel filter may be employed to the activation map with reduced dimensions corresponding to a reduced number of entries. The max pooling layers may be used before the decision layer of the identification of interesting segments activity and/or before the decision layer of the actual character recognition activity. The decision layer might then be layer that provides the final output to be, for example, filled in the above-mentioned form.

BRIEF DESCRIPTION OF THE DRAWINGS

Examples of the invention are now described, also with reference to the accompanying drawings.

The drawings and the description of the drawings are of examples of the invention and are not of the invention itself. Like reference signs refer to like elements throughout the following description of examples.

DETAILED DESCRIPTION

Figure 1:
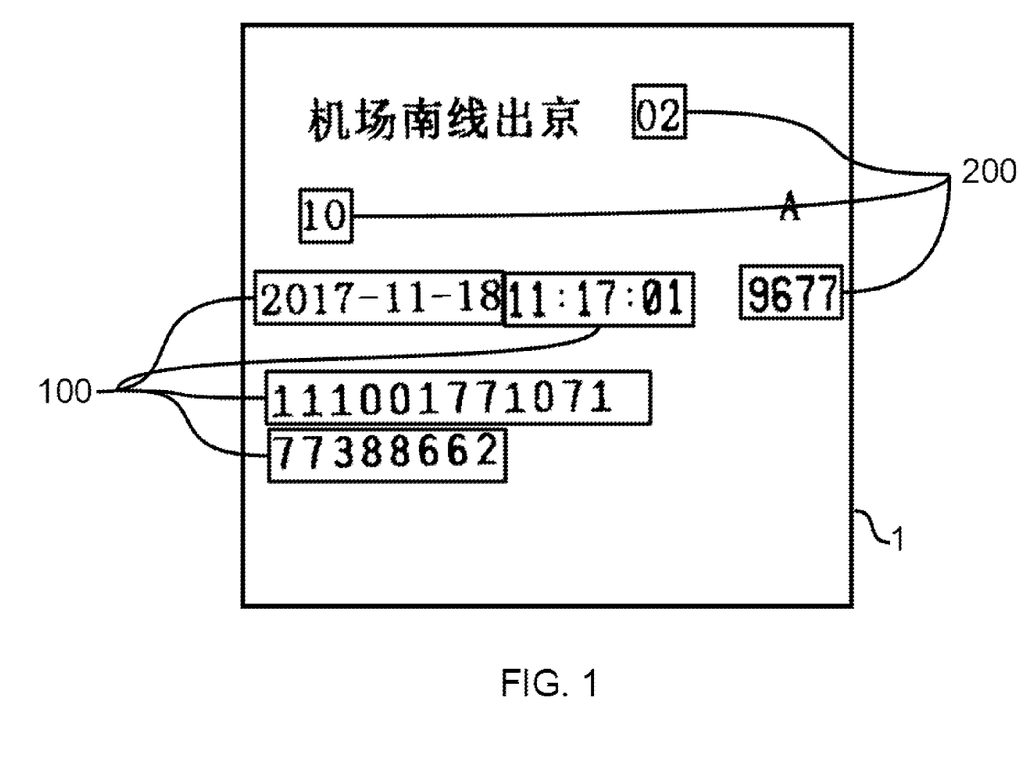
FIG. 1 is an exemplary document from which a total amount information should be extracted, along with bounding boxes around candidates for that information.

An exemplary document 1 from which a total amount information should be extracted, along with bounding boxes around candidates for that information is shown in FIG. 1. The exemplary document 1 illustrated by FIG. 1 is a receipt from a parking garage, a hotel or the like. The exemplary document 1 comprises, e. g., Chinese characters, indicating the purpose of the receipt and several numbers with different purposes (e. g. date, serial number, total amount etc.). The numbers on a scan of the document shown in FIG. 1 are confined by bounding boxes identified, for example, by a fully convolutional neural network-based object identification algorithm.

The object detection algorithm might recognize, for example on the basis of the number format and the number of characters in a string, that the content of bounding boxes 200 probably does not correspond to a total amount, which is the information of a predefined type looked for in this example. This could be achieved, for example, by assigning a probability to correspond to a total amount to each bounding box identified on the scanned document and comparing this probability with a threshold.

However, the object detection algorithm might recognize, also based on the number format and the number of digits contained by a number, that the content of bounding boxes 200 could indeed correspond to a total amount. Also this might be done by identifying probability values associated with the bounding boxes and comparing the probabilities with a threshold.

Figure 2:
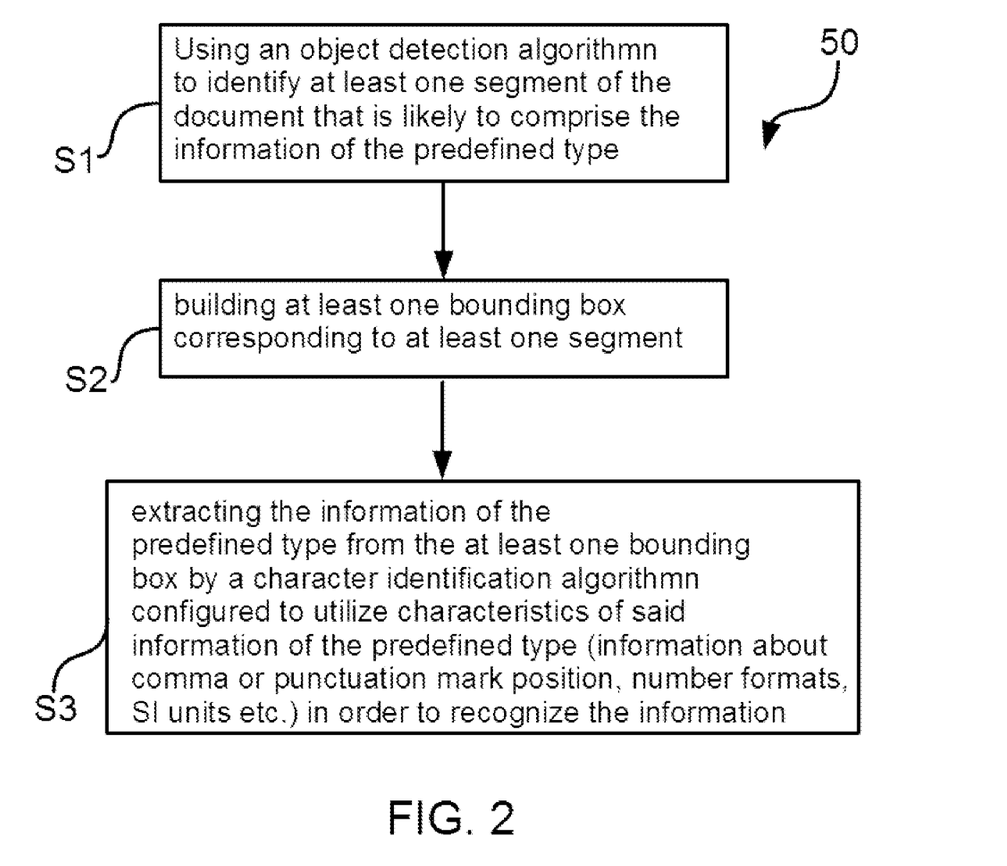
FIG. 2 shows a schematic flow diagram of the method of extracting information.

A schematic flow diagram 50 of an example of the method of extracting information is shown in FIG. 2. In an activity S1, an object detection algorithm to identify segment(s) of interest is used. The information of the predefined type could be the total amount value of the receipt document 1 shown in FIG. 1. The information of the predefined type could be technical specification data on a datasheet or the like.

In an activity S2, at least one bounding box corresponding to the at least one segment is built. The bounding box, for example, surrounds each segment that is likely to comprise the information of the predefined type. In the example document shown in FIG. 1, such segments are segments that comprise numbers of any kind and not language characters, such as the Chinese characters in the document of FIG. 1.

In an activity S3, the information of the predefined type (here: the total amount) is extracted from the at least one bounding box by a character identification algorithm configured to utilize characteristics of the information of the predefined type (information about comma, decimal point or punctuation mark position, number formats, SI units etc.) in order to recognize the information. For recognizing the total amount information on the document illustrated by FIG. 1, for example, a format with a limited number of digits (e.g., three digits) and not more than one punctuation is used as a criterion.

Figure 3:
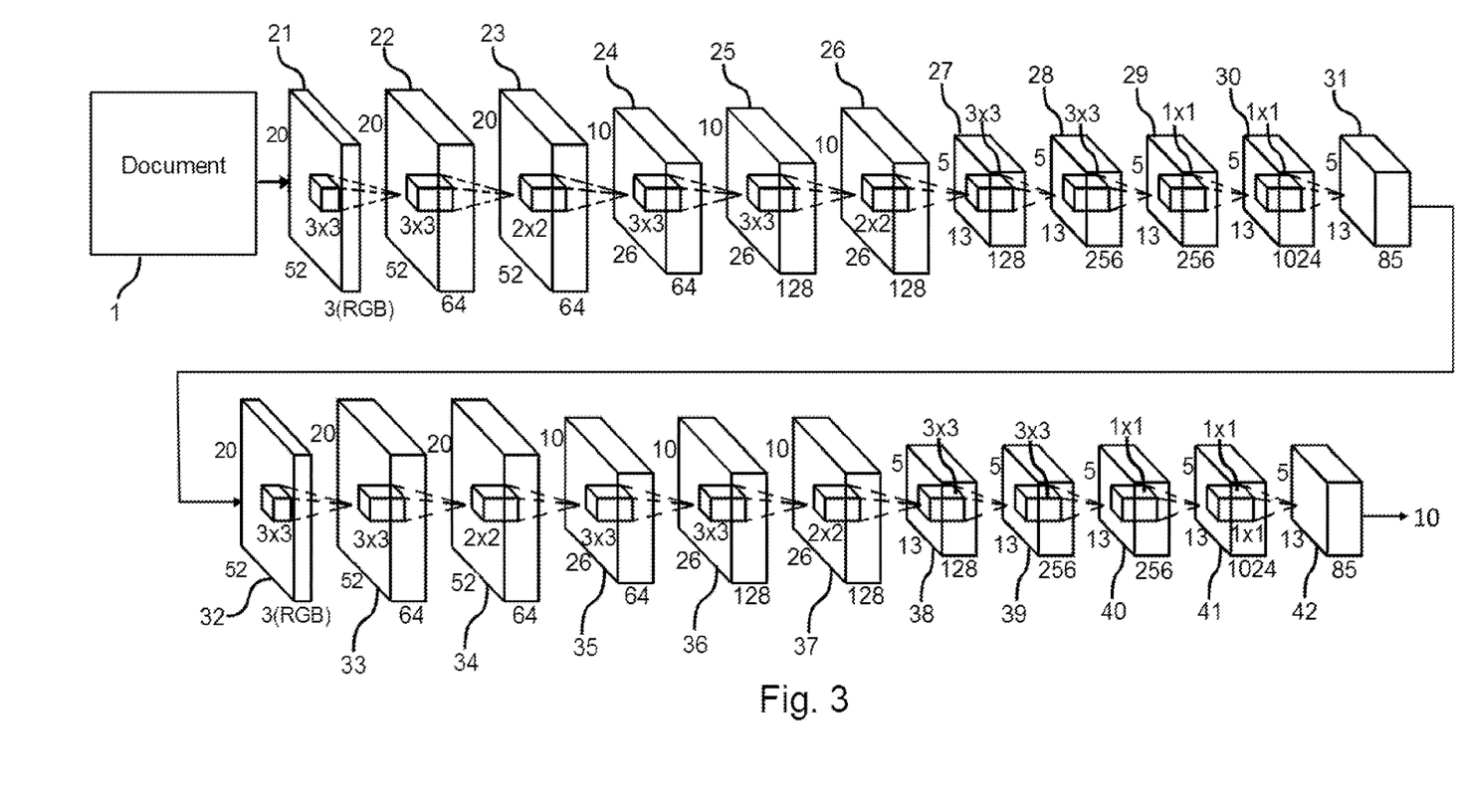
FIG. 3 shows two successive multi-layer neural networks with multiple different kernels used for extracting the information, both multi-layer neural network involving a decision layer.

Two successive multi-layer neural networks with multiple different kernels used for information extraction involving object identification are exemplary illustrated by FIG. 3. Both multi-layer neural networks involve multiple kernels and a decision layer.

In an input layer 21 of the object detection neural network, having a depth of three corresponding to the three RGB channels, the document 1 is converted into three channel deep array of values, with dimensions 52×20×3.

The next two successive layers 22, 23 are convolutional layers, both with dimensions of 20×52×64. In the first convolutional layer 22, a filter kernel with dimension 3×3×64 is applied, while in the second convolutional layer 23, a filter kernel with dimension 2×2×64 is applied. The two successive layers might serve the detection of rudimentary shapes on the image or the like.

The next layer 24 is a first max pooling layer which reduces the width and height of the array of values to dimensions of 26×10. This reduction might serve, for example, to focus only on regions of the foregoing array of values that correspond to non-empty image parts. A filter of dimension 3×3×64 serving, e.g., abstract object detection, is applied as well.

As a next activity, again two successive convolutional layers 25, 26 are applied to the array with reduced dimensions. The depth of the corresponding filter and the value array is increased there to 128. These layers might serve a more precise recognition of shapes and regions.

Layer 27 is a second max pooling layer, which reduces the width and height to 13×5, and additionally applies another 3×3×128 filter kernel.

The subsequent layers 28, 29 and 30 are further convolutional layers. Layer 28 corresponds to an array of a dimension of 5×13×256 and applies a 3×3×256 filter kernel. Layer 29 has the same dimension but a 1×1 filter kernel is applied. The last layer before the decision layer 31 is the convolutional layer 30. The convolutional layer 30 is a deep filter layer corresponding to an array with a depth of 1024. A filter kernel with dimensions 1×1×1024 is applied.

Each layer may serve as an activation map comprising activation values for neurons associated with the neural network layers. The activation values stemming from these activation maps, for example, are input to an activation function, such as a rectangular or sigmoid function, to form the activation potential seen by a respective neuron.

The next layer 31 is the decision layer of the object detection algorithm that finally defines the bounding boxes. The decision layer of such a neural network is further described in conjunction with FIG. 4.

The output of this decision layer is, inter alia, bounding boxes with corresponding probability values that the bounding box indeed contains the information of the predefined type to be extracted, in this example, the total amount value.

The output of the decision layer 31, e.g., the bounding box with the highest probability of containing the information of the predefined type, is fed to the first detection layer of a character identification algorithm 32.

The following, convolutional layers 33, 34, 36, 37, 39, 40, 41, max pooling layers 35, 38 and the decision layer 42 are identical with respect to the dimensions of the arrays and the filter kernels and the sequence of the layers.

However, the layers of this convolutional neural network are customized to character identification out of the beforehand identified bounding box. As described above, also the character identification might involve building bounding boxes, namely a bounding box for each character. For each bounding box a subset of the character set might be determined, corresponding to characters that are allowed to occur in the certain position. Also, a probability value for a character to correspond to the character actually present on the document is assigned.

As such, each number of the total amount is, for example, identified and the total amount is returned to the user after the decision layer. The probability values of each character in the bounding box might be multiplied with each other and if the resulting probability is higher than a threshold value, the corresponding combination of characters is, for example, accepted as a match to the total amount value.

All neural network layers described above, might be implemented as layers of a fully convolutional neural network, such as YOLO v2.

Figure 4:
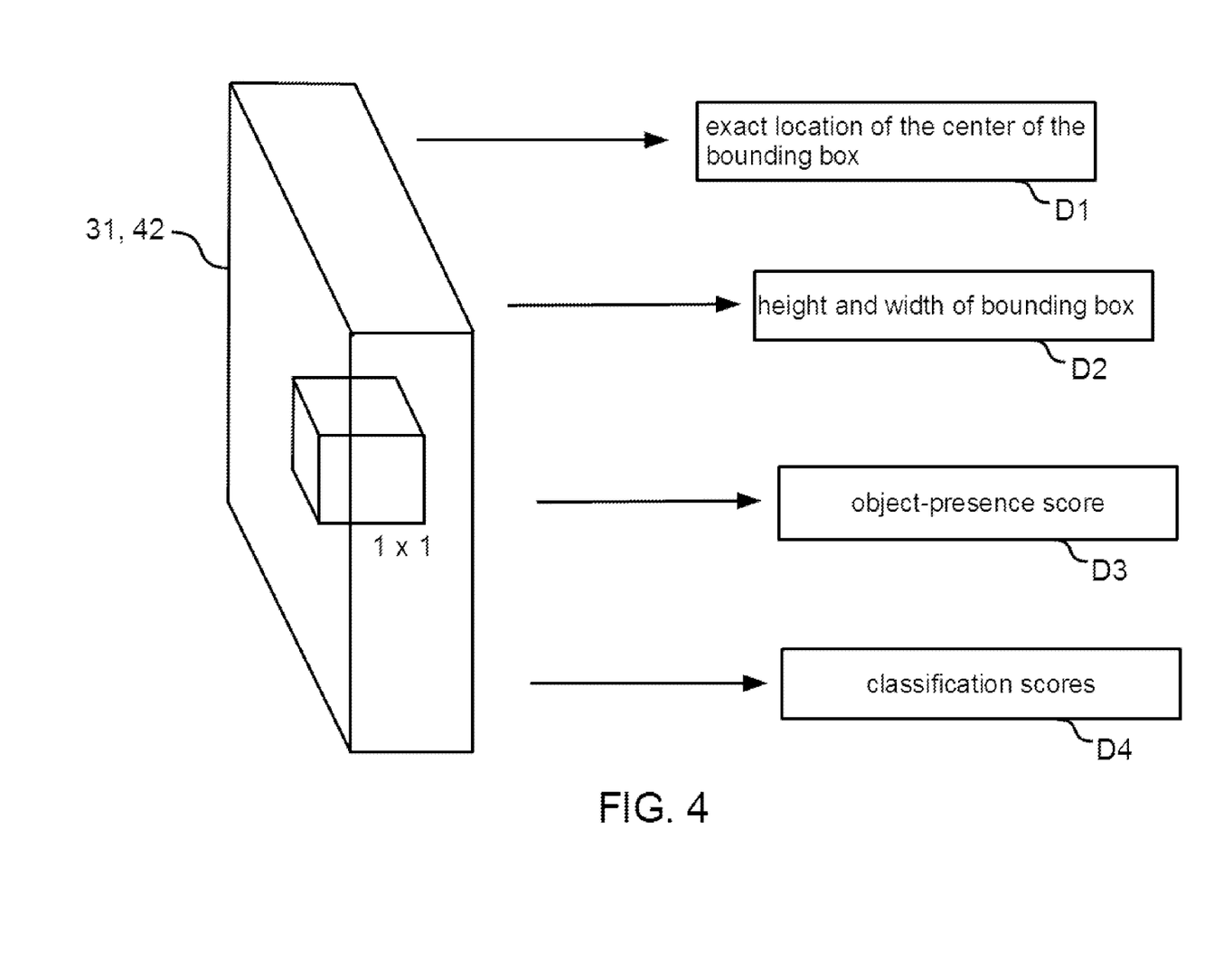
FIG. 4 is a schematic view the exemplary decision layer of FIG. 3 along with possible outputs of this decision layer.

The decision layer(s) 31, 42 and their respective outputs are illustrated in FIG. 4 in greater detail. The decision layer 31, 42 has a filter kernel with a width and height of 1×1. The outputs of the exemplary illustrated decision layer 31, 42 comprise the exact location of the center of the bounding box D1, the width and height of the bounding box D2, the above-mentioned object-presence score D3 and the above-mentioned classification scores D4.

Figure 5:
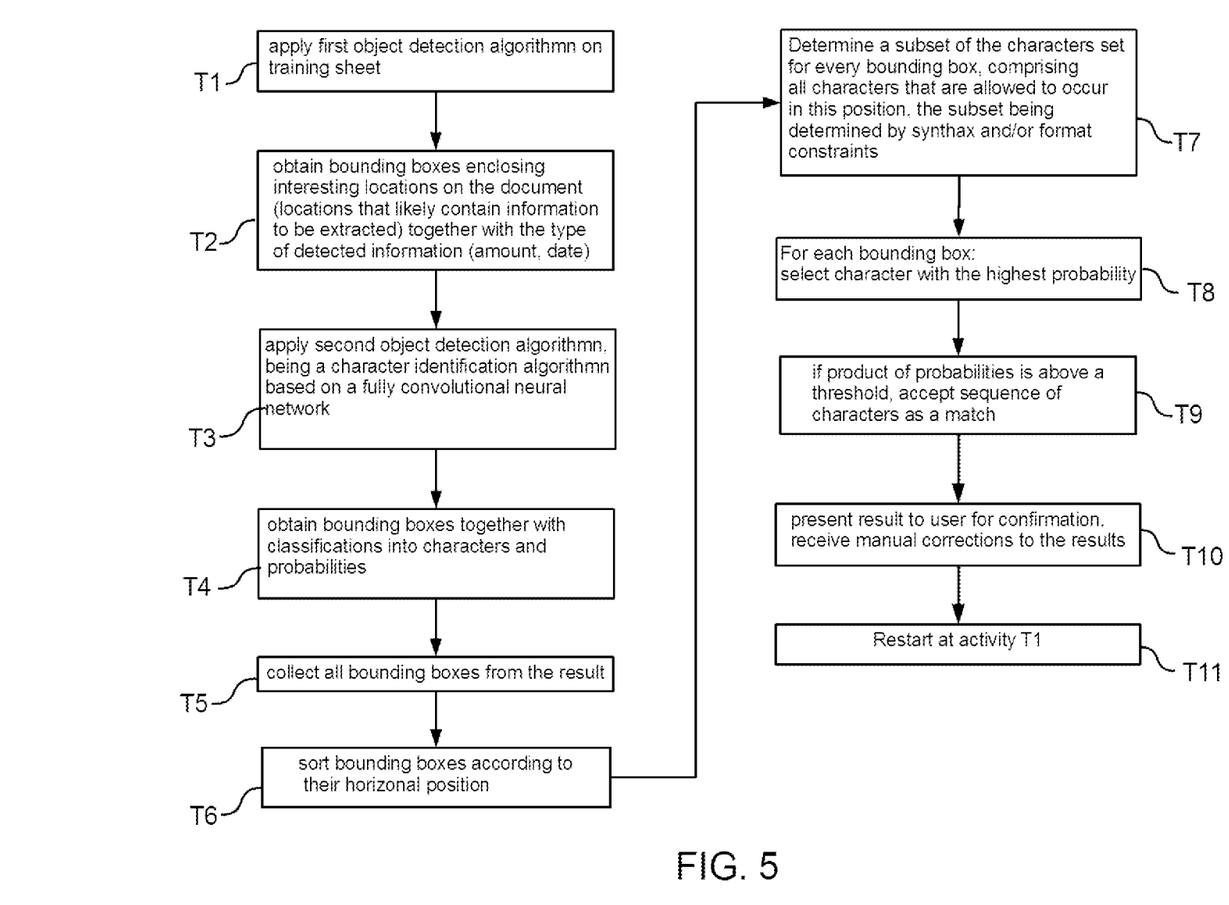
FIG. 5 is a schematic flow diagram of an example of the method comprising train neural networks as shown in FIG. 3.

An exemplary method of extracting information of a predefined type together with an exemplary training carried out in parallel is shown in FIG. 5.

In an activity T1 a first object detection algorithm is applied on the training sheet. The first object detection algorithm may be an algorithm customized to detect the segment(s) of interest and to obtain bounding boxes enclosing those segments.

In an activity T2, the bounding boxes enclosing these interesting locations are obtained. In addition to those bounding boxes, in activity T2, also the type of the detected information (e.g., amount, date) is obtained.

In an activity T3, a second object detection algorithm is applied, which is a character identification algorithm based on a fully convolutional neural network.

In an activity T4, bounding boxes together with classifications into characters and corresponding probabilities for the classification to be correct are obtained.

In an activity T5, all bounding boxes are collected from the result.

In an activity T6, the bounding boxes are sorted according to their horizontal position on the scanned document.

In an activity T7, a subset of characters is obtained for every bounding box. The subset of characters comprises all characters that are allowed to occur in the particular position of the bounding box. The subset is determined on syntax and/or format constraints.

In an activity T8, for each bounding box the character with the highest probability is selected.

In an activity T9, in response to the product of the probabilities being above a threshold, the sequence of characters is accepted as a match.

In an activity T10, the result is presented to a user for confirmation, and manual corrections, carried out by the user are received to enhance the method by, e.g., adapting filter kernels, adapting the weights of certain neurons and the like.

In an activity T11, the method is restarted at activity T1.

Figure 6:
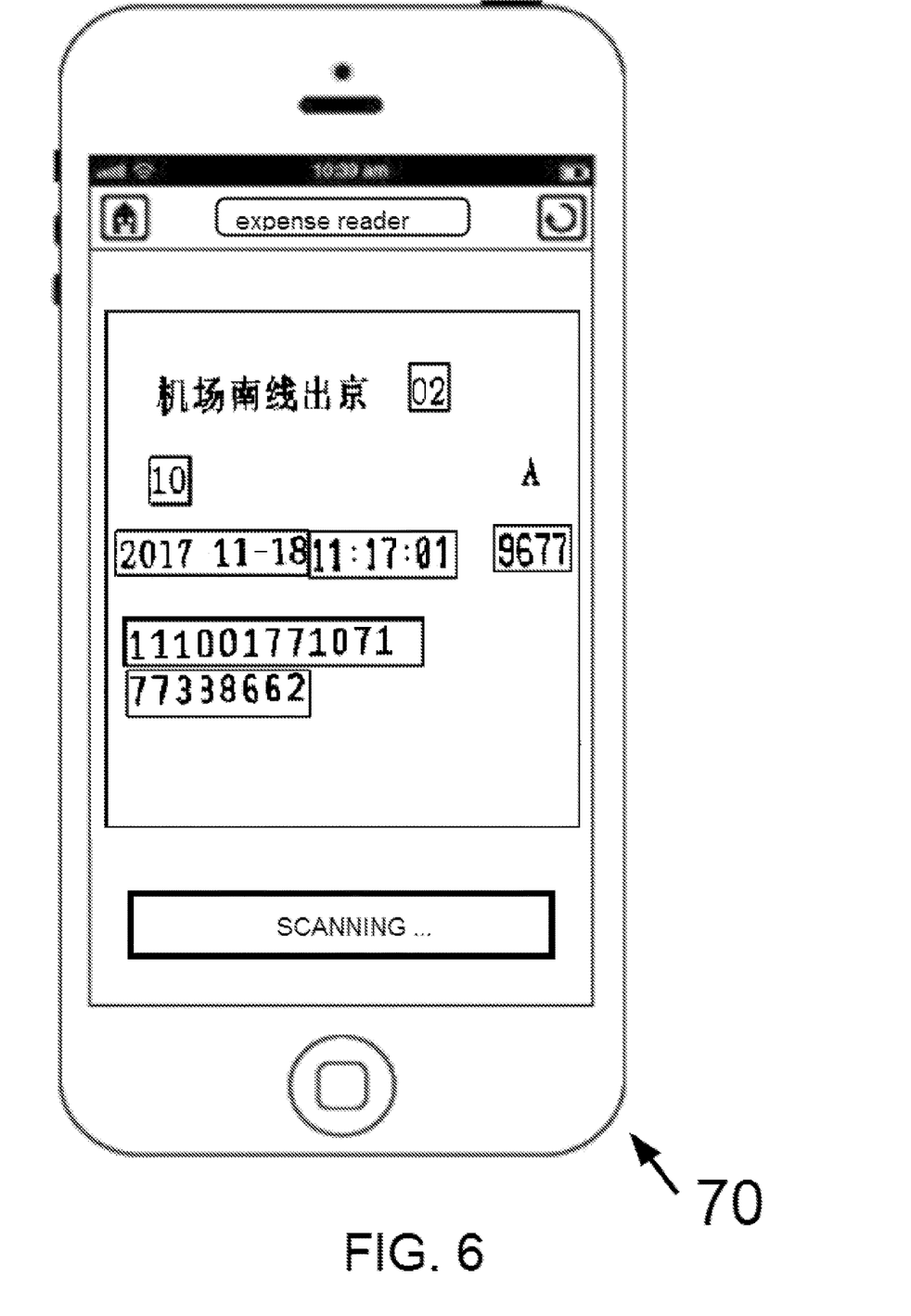
FIG. 6 is a schematic view on a mobile device which is used to perform the method of extracting information.

A mobile device 70 that could be configured to carry out the method in parts or as a whole is illustrated by FIG. 6. The mobile device 70 could be any handheld device with computational abilities, such as a smartphone, a tablet etc.

As mentioned above, the object and character recognizing part of the method might be performed in the backend on a picture that was taken with the camera of the mobile device 70 or the like. The entire method could also be performed on the mobile device 70 itself, with the extracted values being permanently stored on the mobile device 70. Instead of a mobile phone as illustrated in FIG. 6, for example, also a handheld scanning or picturing device with onboard processors and storage capability customized for the method could be used for performing the method.

With the mobile device 70, the user, for example takes a photo of a receipt, a technical specification or the like and sets the type of information he or she wishes to extract, e.g., the total amount. Then the user might activate the object/character recognition method and uses the extracted information, for example, to autofill a form, such as a form for expense reimbursement, a tax declaration or the like.

Figure 7:
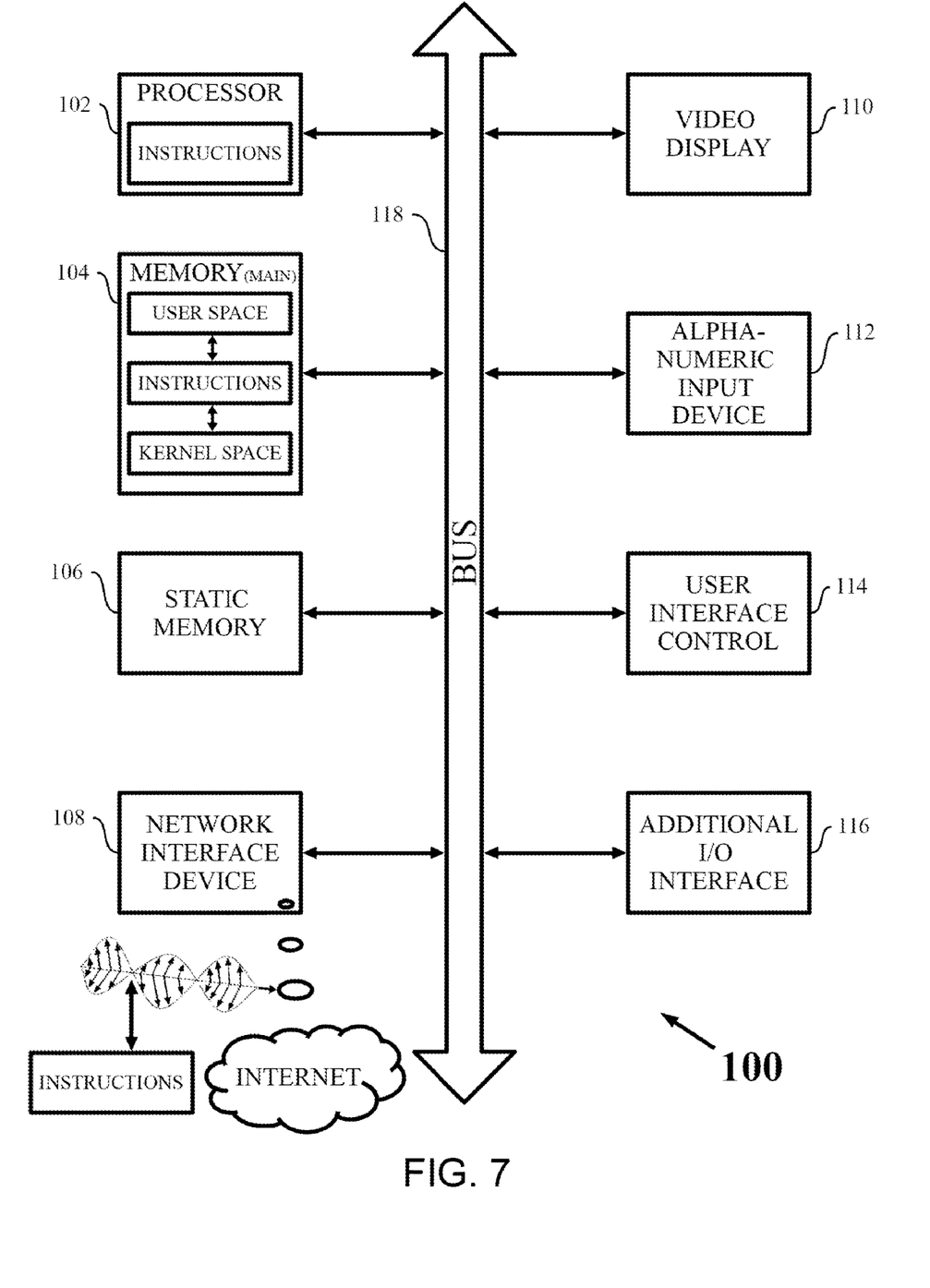
FIG. 7 is a schematic computer on which the method of extracting information from a document may be performed.

An exemplary computer device for carrying out the method or at least parts of the method is illustrated by FIG. 7.

The computer system 100 is arranged to execute a set of instructions on processor 102, to cause the computer system 100 to perform tasks as described herein.

The computer system 100 includes a processor 102, a main memory 104 and a network interface 108. The main memory 104 includes a user space, which is associated with user-run applications, and a kernel space, which is reserved for operating-system- and hardware-associated applications. The computer system 100 further includes a static memory 106, e.g., non-removable flash and/or solid-state drive and/or a removable Micro or Mini SD card, which permanently stores software enabling the computer system 100 to execute functions of the computer system 100. Furthermore, it may include a video display 110, a user interface control module 114 and/or an alpha-numeric and cursor input device 112. Optionally, additional I/O interfaces 116, such as card reader and USB interfaces may be present. The computer system components 102 to 109 are interconnected by a data bus 118.

What is claimed is:

1. A method comprising:
    identifying a location and a classification of a segment of interest of a document that includes information associated with a predefined type;
    identifying a location and a classification of characters from the segment of interest based on characteristics associated with the predefined type and based on a multilayer neural network, wherein the multilayer neural network includes a first layer configured to differentiate between empty regions and non-empty regions of the document and to identify basic patterns present on the document; and
    extracting the identified characters from the segment of interest associated with the predefined type.

2. The method of claim 1, wherein the multilayer neural network includes a second layer configured to identify shapes that are more complex compared to basic patterns present on the document.

3. The method of claim 1, wherein the multilayer neural network is compatible with a decision layer, and the decision layer is configured to detect at least one of (i) a location of a bounding box, (ii) a height and a width of a bounding box, and (iii) a classification score indicating a classification of a detected character.

4. The method of claim 1, wherein identifying the location and the classification of the segment of interest of the document comprises:
    building at least one bounding box corresponding to the segment of interest that likely includes the information associated with the predefined type.

5. The method of claim 4, wherein a character identification algorithm is used for extracting the identified characters from the segment of interest associated with the predefined type from the at least one bounding box.

6. The method of claim 5, wherein the character identification algorithm is configured to utilize characteristics of the information of the predefined type in order to recognize the information of the predefined type.

7. The method of claim 4, wherein a probability value is assigned to the at least one bounding box, and the probability value is indicative of a probability that a certain bounding box contains the information of the predefined type.

8. The method of claim 1, wherein the characteristics of the information of the predefined type comprise a number format and a comma and/or a decimal point.

9. The method of claim 1, wherein the location and the classification of the characters from the segment of interest are identified based on a convolutional multilayer neural network.

10. The method of claim 1, wherein the location and the classification of the characters from the segment of interest are identified based on a fully-convolutional neural network.

11. The method of claim 1, wherein a neural network is used to identify the location and the classification of the characters from the segment of interest, the method further comprising:
    training the neural network with a plurality of documents in a training activity to correctly extract the information of the predefined type.

12. The method of claim 1, wherein the identified characters from the segment of interest associated with the predefined type are extracted based on identifying a character by assigning a probability value to the character, and the probability value is indicative of a probability that each identified character is identical with a character actually comprised by the information of the predefined type.

13. The method of claim 1, further comprising:
    assigning a probability value to at least one bounding box corresponding to the segment of interest that likely includes the information associated with the predefined type; and
    assigning probability values to characters within the at least one bounding box in order to provide a combined confidence score.

14. The method of claim 1, wherein the document is digitally scanned from a paper-based document.

15. The method of claim 14, wherein the information of the predefined type is a creation date, a total amount, an arrival/departure date, a VAT-ID, a receipt id, an invoice number, or a combination thereof.

16. A system comprising:
    a computing device; and
    a computer-readable storage medium comprising a set of instructions that upon execution by the computing device cause the system to:

identify a location and a classification of a segment of interest of a document that includes information associated with a predefined type;

identify a location and a classification of characters from the segment of interest based on characteristics associated with the predefined type and based on a multilayer neural network, wherein the multilayer neural network includes a first layer configured to differentiate between empty regions and non-empty regions of the document and to identify basic patterns present on the document; and extract the identified characters from the segment of interest associated with the predefined type.

17. The system of claim 16, wherein the multilayer neural network further includes a second layer configured to identify shapes that are more complex compared to the basic patterns present on the document.

18. The system of claim 16, wherein the document is digitally scanned from a paper-based document.

19. A non-transitory computer-readable storage medium comprising computer-readable instructions that upon execution by a processor of a computing device cause the computing device to:

identify a location and a classification of a segment of interest of a document that includes information associated with a predefined type;

identify a location and a classification of characters from the segment of interest based on characteristics associated with the predefined type and based on a multilayer neural network, wherein the multilayer neural network includes a layer configured to differentiate between empty regions and non-empty regions of the document and to identify basic patterns present on the document; and extract the identified characters from the segment of interest associated with the predefined type.

20. The non-transitory computer-readable storage medium of claim 19 wherein the multilayer neural network further includes a second layer configured to identify shapes that are more complex compared to the basic patterns present on the document.

* * * * *